3,465,681
MAGNETICALLY-COUPLED PUMP WITH
DETACHABLE MOTOR
Frederick N. Zimmermann, Deerfield, Ill., assignor to
March Manufacturing Company, Glenview, Ill., a corporation of Illinois
Filed Aug. 24, 1967, Ser. No. 663,161
Int. Cl. F04d 13/06, 29/40; H02k 5/10
U.S. Cl. 103—87
14 Claims

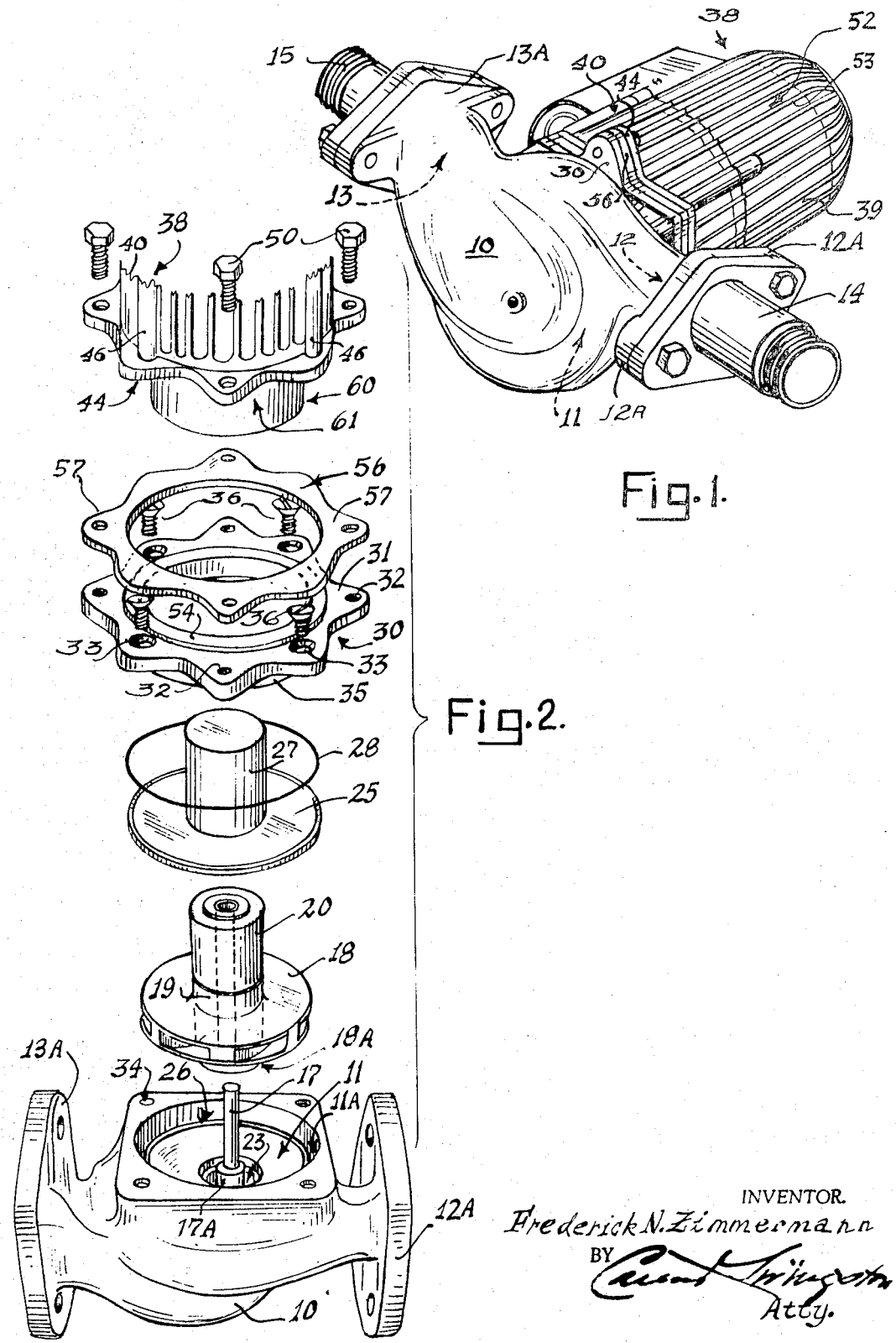

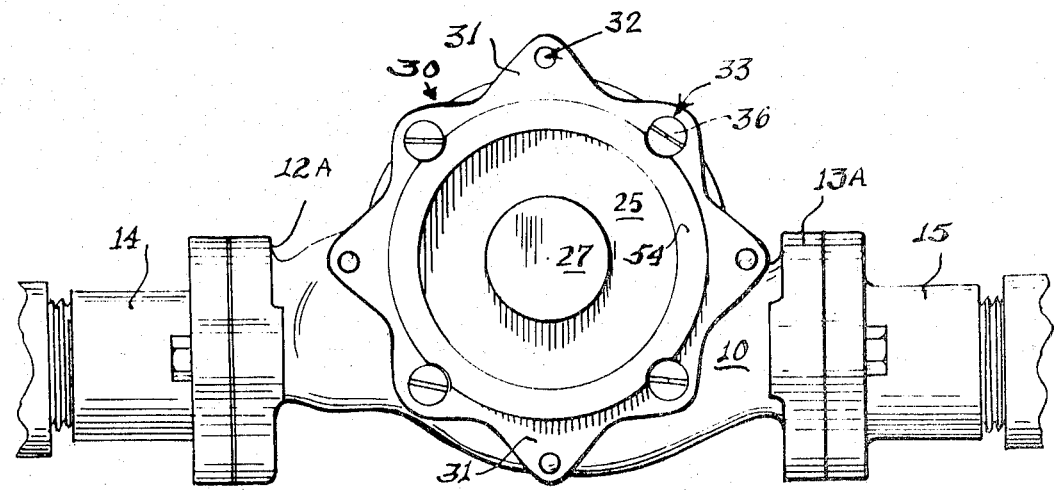
Fig. 4.
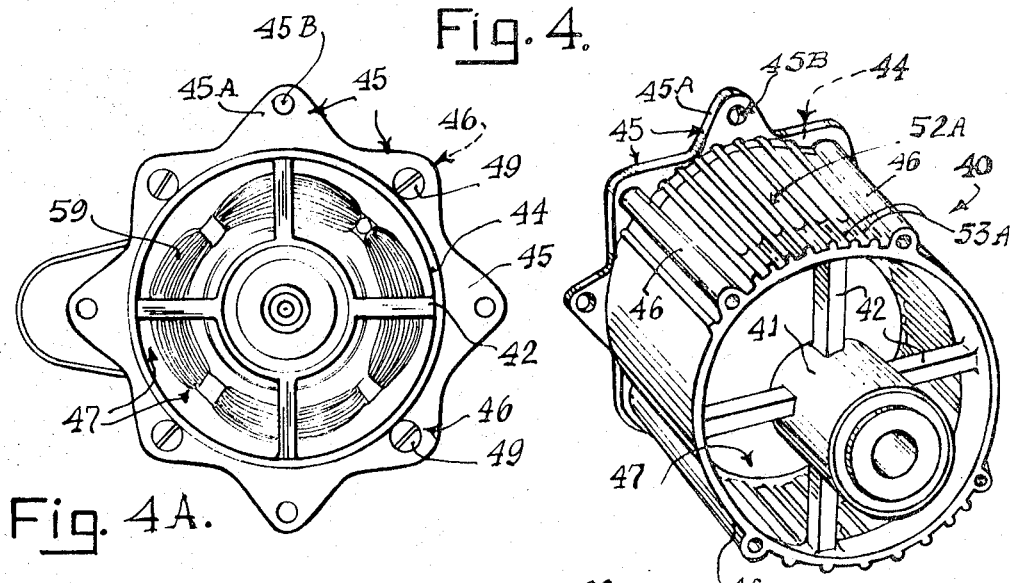
Fig. 4A.   Fig. 4B.
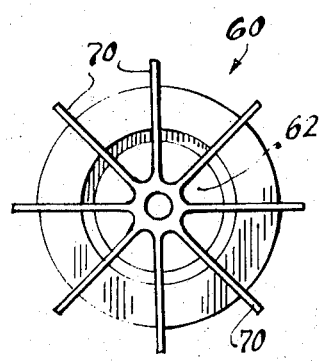
Fig. 5.
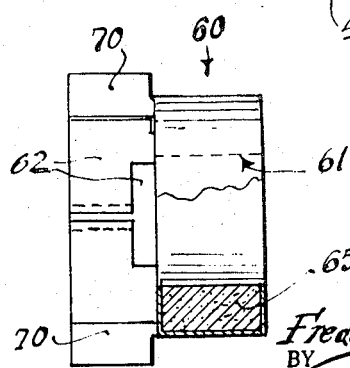
Fig. 5-A.
INVENTOR.
Frederick N. Zimmermann
BY United States Patent Office 3,465,681
Patented Sept. 9, 1969

ABSTRACT OF THE DISCLOSURE

In a magnetically-coupled pump the pump body has an open side through which a driven coupling magnet attached to the impeller is exposed, such side being closed by a plate having a magnet well and held in position by a collared clamping ring which is held to the body by screws; and a driving motor having a head structure fitting against the ring, either directly or with an intermediate heat-barrier collar, is bolted to the body with a driving magnet surrounding the well, the construction being such that the screws holding the clamping collar cannot be accidentally removed to open the pump, but the motor must first be removed, along with the heat barrier before the clamp-ring screws are accessible.

---

This invention pertains to rotary pumps of the magnetically-coupled centrifugal type wherein the impeller is sealed within the pump body and has a driven coupling magnet coaxially rotatable therewith in a communicating chamber, and a motor unit wholly external to the pump body has a driving magnet rotating around the driven magnet in said chamber whereby the impeller is wholly sealed off and no shafts or the like penetrate the pump body to give rise to leakage.

In accordance with the invention, the pump body has an opening through which the driven magnet is exposed, and such opening is closed and sealed by a closure structure comprising a closure plate including as a part thereof the chamber or well in which the magnet is closely but rotatably confined, such closure member being sealingly secured in place by a special retaining ring bolted to the pump body; while the motor comprises a detachable unit which in turn is removably affixed to the retaining ring in a manner which permits detachament of the motor unit without opening up the pump or flow line connecting therewith.

Further features relate to the provision of a heat barrier element interposed between the retaining ring and the motor unit to minimize conductive heat transfer from pumps handling very hot liquids, and to the provision of a motor housing including a special head structure having a complementary configuration adapted to attachment to the retaining ring as aforesaid, and also serving to enclose the driving magnet.

Supplements to the subject: the closure structure comprises a plate and integral well formation; the opening in the pump body is cylindrical and the retaining ring has a collar fitting closely therein and bearing against the closure plate, screws being turned up through radially-salient tabs on the ring into the pump body to clamp the ring against the plate, the ring having other tabs with tapped bores by means of which a matching flange and tab structure on the motor head is attached to the ring, such that detachment of the motor does not disturb the sealed and clamped condiion of the closure plate. A combination locating ring and heat barrier of like configuration with the retaining ring and complementary flange structure on the motor head is interposed between the latter and the retaining ring.

The foregoing and further objects and aspects of novelty and utility characterizing the invention will be more fully apparent from the following description taken with the annexed drawings in which:

FIGURE 1 is a perspective view of the pump shown with fragmentary connections in a flow line;

FIGURE 2 is an explodetd perspective view of the pump and mounting components with parts of the driving motor shown fragmentally;

FIGURE 4 is an elevational view of the pump with the motor unit removed and the line connections shown fragmentally;

Figure 3:
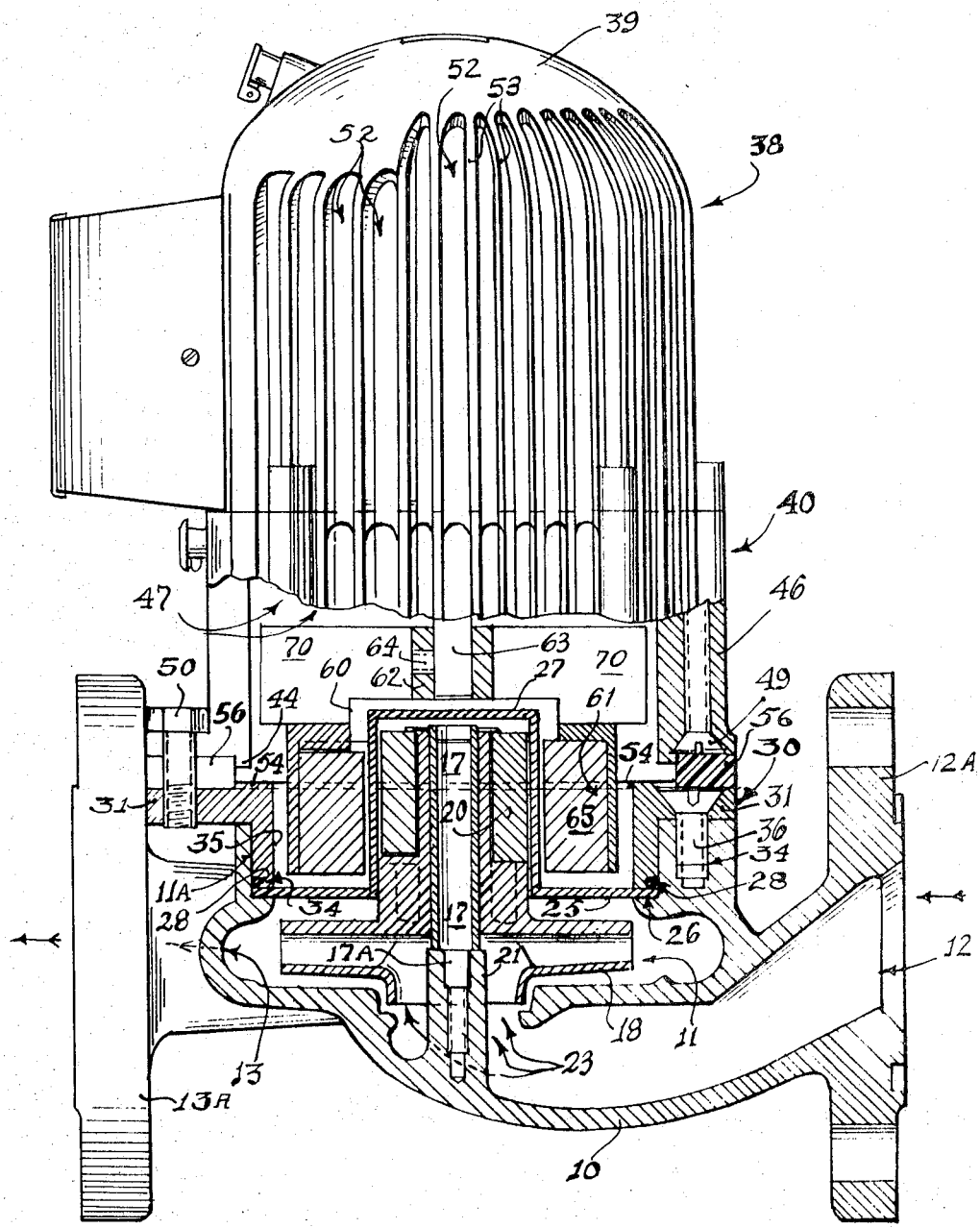
FIGURE 3 is a sectional view of the pump to enlarged scale with portions of the motor unit shown in elevation.

FIGURE 4–A is an elevational view of the head or pump end of the motor unit adapted for joinder with the side of the pump shown in FIGURE 4;

FIGURE 4–B is a perspective view of the head casting for the motor housing looking in a direction opposite from that of FIGURE 4–A;

FIGURE 5 is a front elevational view of the combination magnet carrier and fan;

FIGURE 5–A is a side view of the magnet carrier and fan.

As viewed in FIGURE 1, the pump structure comprises a body casting 10 containing a pump chamber 11 communicating with inlet an outlet ports 12 and 13 respectively terminating in pipe-coupling flanges 12A and 13A adapted for connection in a flow line connecting with the flanged pipe nipples 14 and 15. A detachable motor unit 38 is secured to the pump body by a special sealing and mounting means hereafter more fully described.

Referring to FIGURES 2 and 3, the pump chamber 11 contains a rotary impeller unit 18 having a hub portion 19 upon which is fixed an annular permanent magnet 20 constituting a driven coupling magnet. This impeller unit fits upon a spindle 17 secured at its foot 17A in a seat 21 which is an integral part of the body casting, it being observed that such single-ended mounting of the spindle constitutes a form of cantilever support in which the fixed or footed end thereof lies in an "inlet zone" indicated generally at 23, FIGURE 3, and which may be defined as the area situated in the region immediately opposite the axial end portions 18A of the impeller unit which subjoin the impeller vanes, such that the inflowing fluid to be displaced by the impeller from the input side of the flow line connecting to port 12 will move toward and about the fixed end of the spindle and the appertaining end of the impeller.

The aforesaid mounting of the fixed end of the spindle with its principal support in the inlet zone constitutes part of the disclosures of a copending application Ser. No. 584,171, and affords advantages in that such inlet zone is a low-pressure area, while 'the principal stress on the spindle due to the pumping load is greatest in this region by reason of the adjacency of the impelling blades or vanes thereto.

When the impeller unit is fitted into the pump chamber 11, as in FIGURE 3, said chamber is sealed off by a closure means in the form of a disc 25 fitting closely therein onto a seating ledge 26 in the body casting, said disc having formed as an integral part thereof a cylindrical magnet well 27 closed at its outer end or bottom and projecting axially away from the chamber and impeller, this well being adapted to receive closely, but freely rotatable therein, the driven annular coupling magnet 20.

Means for supporting the motor unit and maintaining the disc-like closure structure 25, 27 in sealed closing relationship with the open side of the pump chamber 11 comprises a special retaining ring 30, seen particularly in FIGURE 2, and having a serrated or undulatory peripheral margin providing a series of radially-salient mounting fingers or tabs 31 projecting therefrom, alternate ones of which are provided with tapped screw holes 32, while the intervening tabs are provided with untapped but countersunk screw bores 33, the special purpose of which will appear hereinafter.

Projecting in an axially-salient direction from one face of the closure retaining ring 30, FIGURES 2 and 3, is an annular collar 35 having a diameter adapted to seat into the open side of the pump chamber in close fit with the annular wall portion 11A thereof and when thus seated said collar bears closely against an interposed sealing ring 28 and the underlying margins of the closure plate 25 to press the latter onto the seating ledge 26, responsive to tightening of the retaining screws 36, the latter being flat-headed to seat flush down into the countersunk bores 33 when threaded into the tapped bores 34 in the pump body.

In the foregoing seated condition of the closure plate means 25 the pump has the appearance seen in FIGURE 4 in which it is evident that the pump chamber 11 is closed and sealed against accidental opening and any escape of the fluid from the pumping chamber or the flow line 14-15 connected thereto, it being further observed that in this condition the motor driving unit is wholly detached from the pump body, as would be the case where the motor is yet to be installed or has been removed for servicing, or the like; while the flow line is maintained in closed condition so far as leakage from the pump unit is concerned.

As depicted in FIGURE 3, the motor drive unit 38 comprises any suitable type of electric motor contained in a special housing consisting of a main elongated shell section 39 closed at one end and fitted with a special mounting head 40 at its opposite end, said head being a casting having the configuration seen in FIGURE 4-B, and being of cylindrical contour with a motor bearing hub 41 situated in the opening at one end thereof, said hub being supported by integral webs 42, while the opposite end of this head casting is wholly open to provide a deep recess and chamber 47 for the driving pump-coupling magnet, as will more fully appear hereafter.

Integrally formed about the mouth of the head casting is an axially-salient pump-mounting flange 44 having a serrated configuration matching that of the pump retaining ring 30, including radial tabs 45 registering with the like tabs 31 of the retaining ring. Alternate ones of the head-flange tabs 45 communicate through counterbored bolt sleeves 46 formed with the well for recessed reception of head-mounting bolts 49 by which the head casting is fastened to the motor shell (FIGURE 3 also), while the intervening tabs, as at 45A, are provided with passage bores 45B for motor-mounting bolts 50 which thread into the tapped bores 32 in the sealing and retaining ring 30 affixed to the pump body, FIGURES 2 and 3, when the motor unit is to be joined to the pump.

The motor housing shell and head are provided with venting configurations in the form of elongated slots 52 and flanking radiating fins 53 by which cooling air is passed by a special fan structure to be described.

The bore of the closure-retaining ring will preferably be supplied with a second radially-salient collar 54 on the face thereof which is opposite from the first mentioned chamber-engaging collar 35, this second collar being for the purpose of seating in registry with a substantially rigid barrier and locating ring or gasket 56 having complementary radial tab or finger serrations 57 positioned and bored to match the mounting tabs 45 of the motor-mounting flange 44, said ring 56 being preferably of a non-metallic or other low heat-conducting material of the class of synthetics such as Bakelite, Micarta, Formica, and the like, having substantial rigidity and minimal cold flow characteristics suited to maintenance of the motor in firmly seated and aligned registry with the pump axis.

The cavity 47 at the open end of the head casting, FIGURE 3, accommodates a rotatable driving magnet assembly comprising a magnet carrier 60 having a cylindrical magnet-seating cavity 61 on its outer face in which driving magnet 65 is secured, and an integral hub portion on its opposite face adapted to be fixed on the motor shaft 63 by a set screw 64, there being a driving magnet of annular configuration secured in the cavity by suitable means such as cementing, force-fit, or the like. The internal diameter of the bore of the annular driving magnet is such as to fit closely but rotatably, with minimal air gap, about the outer periphery of the magnet well 27 of the pump closure member 25 in such manner that the two magnets rotate about concentric axes and the magnetic fields thereof coact as the coupling means whereby driving torque is imparted to the impeller unit when the motor is running.

The magnet carrier 60 will preferably be of the novel construction disclosed and claimed in a copending application Ser. No. 710,958 according to which the carrier has, formed as an integral part thereof, an impeller serving as a fan for the motor and including radial vanes 70 projecting from the hub 62 to rotate with the carrier in a space between the driving magnet and motor winding 59.

In addition to effecting economies in manufacture and assembly, the combination magnet carrier and fan unit is arranged and constructed to expel air through the venting slots 52A, 53A in the head casting, this being of particular importance when the pump is required to handle very hot liquids in order to prevent transfer of heat by convection into the motor winding, cooling air also being drawn into the motor housing through the slots 52.

Transfer of heat by conduction from the hot pump body into the motor housing is also effectively reduced by the interpositioning of the locator and barrier ring 56 by reason of its low heat-conductive character.

In prior constructions of magnetically-coupled pumps of the class described it has been known to clamp a closure plate, including a well or chamber for the driven coupling magnet, in between a motor-mounting frame or bracket and the pump body, illustrations of this type of construction being found in United States Letters Patent Nos. 2,810,349 (Zozulin), 3,198,125 (Yuza), Re. 26,094 (Zimmermann), 3,238,878 (Martin), for example; but this practice has the disadvantage of opening up the flow line via the pump chamber whenever it becomes necessary to service or replace the motor, with a consequent necessity for draining or shutting off the flow, whereas the presently disclosed improvements eliminate such requirements and avoid the danger of accidental leakage, particularly serious in the case of high temperature and chemical conveying lines, when access to, or removal of the motor unit is required.

I claim:

1. In a magnetically-coupled pump of the class described, including a pump body adapted for connection in a flow line and having an impeller with a driven coupling magnet exposed through an opening in the body for coaction with a driving coupling magnet rotated by motor means, together with a closure member for said opening carrying a chamber projection in which the driven magnet rotates, the combination of: a retaining ring and means removably affixing the same to the pump body about said opening; means on the retaining ring bearing against the closure member to urge the same into sealed closing condition; and motor means including a motor and housing therefor having an attaching formation engaging with the retaining ring; means detachably securing said attaching formation to the ring, with a driving magnet in position to rotate coaxially about said chamber projection and the driven magnet therein, the means affixing the closure member to the pump body being concealed from access by the attaching formation of the motor housing in the attached condition of the latter, whereby removal of the closure member accidentally, or as a necessary condition for removal of the motor unit, is obviated.

2. The combination of claim 1 wherein the means for affixing the retaining ring to the pump body comprises screws or the like engaging the pump body through the ring and seating flush into the side of the ring proximate to the motor means.

3. The combination of claim 1 wherein the closure member is a plate fitting into a recessed seat portion of the pump body marginal to said body opening, and the means bearing against the closure member is a salient collar integral with the retaining ring and fitting into said opening against said plate to urge and hold the latter sealingly in said seat portion.

4. A pump structure according to claim 1 wherein the attaching formation on the motor housing comprises an integral part of a head structure removably attached to an end of the motor housing and having integral flange means with portions complementary in configuration to fit with the retaining ring on the pump body and block access to the means affixing the ring to the pump body as aforesaid; and attaching means removably engaging said flange means of the head structure and said retaining ring whereby to detachably join the motor housing in assembly with the pump in the manner and for the purposes set forth.

5. the combination of claim 1 wherein said means bearing against the closure member is an axially-salient collar on the retaining ring entering said opening in the pump body to engage the closure member; and the retaining ring has a marginal flange fitting against the body circumambiently of the opening with alternate tapped and untapped screw bores therethrough and spaced apart thereabout, the means for affixing the ring to the body as aforesaid comprising screws threading into the body through said untapped bores and having heads recessed into the face of the ring proximate to the motor means, said attaching formation on the motor housing having the form of a mating flange formation adapted for joinder with the marginal flange of the retaining ring, and the means detachably securing said mating flange to the ring comprises bolts passed through the same at spaced intervals to engage in the spaced tapped bores in the retaining ring.

6. The combination of claim 1 wherein there is additionally provided a heat barrier means between the pump and motor housing in the form of a ring-like member of substantially rigid material having low heat conductivity fitted and clamped in between said retaining ring and said attaching formation on the motor housing.

7. The combination of claim 5 wherein there is additionally provided a heat barrier means between the pump and motor housing and having the form of a barrier ring of substantially rigid non-metallic material having low heat conductivity, said barrier ring having a configuration to mate with the confronting assembly sides of the retaining ring and flange means on the motor housing head structure and being interposed between the latter and having spaced through-bores for passage of the attaching means which detachably joins the motor housing to the pump as aforesaid.

8. The combination of claim 7 wherein said retaining ring and said flange means on the motor head structure each have an axially-salient collar formation in registering interfit with the bore of said heat-barrier ring in assembly as aforesaid, whereby to further dispose the motor housing in predetermined operative registry and alignment with the pump body and the driven coupling magnet.

9. In a magnetically-coupled motor-driven centrifugal pump, means for detachably securing a motor unit to a pump body of the type having an opening through which a driven coupling magnet is exposed for coaction with an external driving magnet rotated by the motor unit, said means comprising: a closure member for said opening, an enclosing chamber integral with the closure member for enclosing the driven magnet; a retaining ring fitting about said opening and removably secured to the pump body by a first attaching means engaging the body through the ring from the outer side of the latter which is proximate to the motor unit; means on the ring bearing against the closure member to urge the same into sealed closing condition responsive to action of the attaching means aforesaid; and a motor unit including a motor and a housing shell therefor having an open end terminated by a head structure with flange formations fitting against said ring and barring access to said first attaching means in assembly with the ring; together with second attaching means on the head structure and exposed for manipulation to engage the retaining ring to join the motor unit thereto, or detach the unit therefrom, without danger or necessity of accidental or requisite removal of the closure member and resultant opening of the pump to leakage when the motor unit is to be removed or replaced.

10. In a magnetically-coupled centrifugal pump, the combination, with a pump body adapted for connection in a flow line and having an opening exposing a driven coupling magnet which is coaxially rotatable with an impeller in said body, of: a closure member for said opening carrying an enclosing chamber for the driven coupling magnet; a retaining ring and means removably affixing the same to the pump body about said opening, said ring having a salient collar formation in engagement with the closure member to urge the same into sealed closing condition; and a motor unit comprising a motor and housing therefor, and a driving coupling magnet rotated by the motor; together wtih mounting means attached to said housing and aligning with said retaining ring for detachably securing the motor housing in cooperative joinder to said retaining ring with the driving magnet coaxially and circumambiently rotatable about the chamber enclosing the driven magnet, access to said means affixing the retaining ring to the pump body being blocked by the mounting means of the motor housing when joined to the pump body as aforesaid, such that detachment and removal of the motor unit does not accidentally or otherwise disturb the sealed closed condition of the pump body and can be effected without leakage from the pump body or the necessity to drain or shut off the flow line.

11. In combination with a pump housing having an access opening aligned with a driven impeller means, a closure for said opening, and a motor unit mounted in confrontation with said closure for driving cooperation with the impeller means, motor-mounting and closure-securing means comprising: an intermediate mounting member of ring-like configuration fitting in assembly with said housing about said access opening and having a closure-engaging portion for maintaining the closure in sealed closing condition; first means removably securing said intermediate member to the housing to maintain the same in closure-engaging condition; second means forming part of the motor unit adapted to fit in assembly with the intermediate member with the motor in driving relation to said driven impeller means; third means removably securing the second means and appurtenant motor unit in assembly with the intermediate member as aforesaid, said second means preventing access to said first means in the assembled condition of the motor unit, whereby removal of the latter can be effected without necessary or unintended disturbance of the sealed condition of the closure.

12. The combination of claim 11 wherein said first securing means comprises a first screw means engaging the pump housing through the intermediate member; wherein said third securing means comprises a further screw means engaging the intermediate member through the second means, and the second means fits against the intermediate member to overlie and block access to the first screw means, such that removal of the latter first requires removal of the motor unit.

13. The combination of claim 12 wherein the ring-like intermediate member is provided about its external periphery with a series of radially-salient tabs, certain ones of which are bored to pass said first-mentioned screw means into engagement with the pump housing, and further ones of which are tapped to receive said further screw means.

14. The combination of claim 13 wherein said second means is a flange formation on part of the motor unit which flange formation is provided with a matching series of radially-salient tabs adapted to fit in registry with the tabs on the intermediate member and certain of the tabs on the motor unit flange formation are bored to pass the said further screw means for engagement with the intermediate member to secure the motor unit in assembly therewith as aforesaid.

References Cited

UNITED STATES PATENTS

| | | | |
|---|---|---|---|
| 2,970,548 | 2/1961 | Berner | 103—87 |
| 3,195,467 | 7/1965 | Collet | 103—87 |
| 3,238,878 | 3/1966 | Martin | 103—87 |

ROBERT M. WALKER, Primary Examiner

U.S. Cl. X.R.

310—104